(12) United States Patent
Morana

(10) Patent No.: US 8,593,339 B2
(45) Date of Patent: *Nov. 26, 2013

(54) MOBILE SATELLITE COMMUNICATIONS

(75) Inventor: Sebastian Morana, Aldie, VA (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 275 days.

This patent is subject to a terminal disclaimer.

(21) Appl. No.: 12/585,056

(22) Filed: Sep. 1, 2009

(65) Prior Publication Data

US 2010/0060515 A1    Mar. 11, 2010

Related U.S. Application Data

(63) Continuation of application No. 11/618,379, filed on Dec. 29, 2006, now Pat. No. 7,592,953.

(60) Provisional application No. 60/755,405, filed on Dec. 30, 2005.

(51) Int. Cl.
*H04B 7/185* (2006.01)
*G01S 19/11* (2010.01)

(52) U.S. Cl.
USPC ..................... 342/353; 342/357.48

(58) Field of Classification Search
USPC .................. 342/353, 357.4, 357.48, 357.63; 455/13.1
See application file for complete search history.

(56) References Cited

U.S. PATENT DOCUMENTS

| 4,486,739 | A | 12/1984 | Franaszek et al. |
|---|---|---|---|
| 4,649,396 | A | 3/1987 | Friedman |
| 4,876,737 | A | 10/1989 | Woodworth et al. |
| 4,901,307 | A | 2/1990 | Gilhousen et al. |
| 5,109,390 | A | 4/1992 | Gilhousen et al. |
| 5,309,474 | A | 5/1994 | Gilhousen et al. |
| 5,376,778 | A | 12/1994 | Kreft |
| 5,490,165 | A | 2/1996 | Blakeney, II et al. |
| 5,537,397 | A | 7/1996 | Abramson |
| 5,559,790 | A | 9/1996 | Yano et al. |
| 5,566,168 | A | 10/1996 | Dent |
| 5,568,472 | A | 10/1996 | Umeda et al. |
| 5,570,350 | A | 10/1996 | Myer et al. |

(Continued)

FOREIGN PATENT DOCUMENTS

| DE | 10 2004 016 548 | 10/2005 |
|---|---|---|
| EP | 1 406 207 | 4/2004 |

OTHER PUBLICATIONS

McDermott, Specification and Drawings, U.S. Appl. No. 11/876,747, Oct. 22, 2007, 28 pgs.

(Continued)

*Primary Examiner* — Dao Phan
(74) *Attorney, Agent, or Firm* — Morgan, Lewis & Bockius LLP

(57) ABSTRACT

Provided is a mobile satellite transceiver system for communicating with a Global Positioning System (GPS) satellite and a communications satellite. In on implementation, the mobile satellite transceiver system includes a GPS receiver configured to receive communications from the GPS satellite, a satellite modem configured to transmit and receive communications from the communications satellite, and an operating system. In some implementations, the operating system of the mobile satellite transceiver system is configured to send and receive text messages to/from the communications satellite via the satellite modem. In some implementations the mobile satellite transceiver system also includes a Radio Frequency Identification (RFID) interrogator for communicating with RFID tags.

20 Claims, 5 Drawing Sheets

(56) References Cited

U.S. PATENT DOCUMENTS

| | | | |
|---|---|---|---|
| 5,612,949 A | 3/1997 | Bennett | |
| 5,625,629 A | 4/1997 | Wenk | |
| 5,640,166 A | 6/1997 | Siwiak | |
| 5,668,556 A | 9/1997 | Rouffet et al. | |
| 5,694,396 A | 12/1997 | Firouzbakht et al. | |
| 5,697,050 A | 12/1997 | Wiedeman | |
| 5,724,384 A | 3/1998 | Kim et al. | |
| 5,758,260 A | 5/1998 | Wiedeman | |
| 5,790,070 A | 8/1998 | Natarajan et al. | |
| 5,796,777 A | 8/1998 | Terlep et al. | |
| 5,815,071 A | 9/1998 | Doyle | |
| 5,818,883 A | 10/1998 | Smith et al. | |
| 5,835,069 A | 11/1998 | Skoog | |
| 5,841,765 A | 11/1998 | Fielding et al. | |
| 5,872,777 A | 2/1999 | Brailean et al. | |
| 5,920,278 A | 7/1999 | Tyler et al. | |
| 5,983,111 A | 11/1999 | Kim | |
| 5,999,561 A | 12/1999 | Naden et al. | |
| 6,052,561 A | 4/2000 | Rudowicz et al. | |
| 6,084,919 A | 7/2000 | Kleider et al. | |
| 6,088,413 A | 7/2000 | Autry et al. | |
| 6,100,806 A | 8/2000 | Gaukel | |
| 6,121,922 A | 9/2000 | Mohan | 342/357.1 |
| 6,128,276 A | 10/2000 | Agee | |
| 6,128,469 A | 10/2000 | Zenick, Jr. et al. | |
| 6,151,313 A | 11/2000 | Abramson | |
| 6,163,681 A | 12/2000 | Wright et al. | |
| 6,185,245 B1 | 2/2001 | Kim | |
| 6,188,682 B1 | 2/2001 | Takagi et al. | |
| 6,205,167 B1 | 3/2001 | Kamgar et al. | |
| 6,226,531 B1 | 5/2001 | Holt et al. | |
| 6,307,840 B1 | 10/2001 | Wheatley, III et al. | |
| 6,317,029 B1 | 11/2001 | Fleeter | |
| 6,339,611 B1 | 1/2002 | Antonio et al. | |
| 6,349,110 B1 | 2/2002 | Davidovici et al. | |
| 6,353,730 B1 | 3/2002 | Buettner et al. | |
| D455,641 S | 4/2002 | Trifilio | |
| 6,373,831 B1 | 4/2002 | Secord et al. | |
| 6,396,819 B1 | 5/2002 | Fleeter et al. | |
| 6,421,373 B1 | 7/2002 | Saito | |
| 6,438,118 B1 | 8/2002 | Matui | |
| 6,507,602 B1 | 1/2003 | Dent | |
| 6,510,172 B1 | 1/2003 | Miller | |
| 6,529,488 B1 | 3/2003 | Urs et al. | |
| 6,549,559 B2 | 4/2003 | Kamgar et al. | |
| 6,574,205 B1 | 6/2003 | Sato | |
| 6,628,699 B2 | 9/2003 | Ramberg et al. | |
| 6,639,906 B1 | 10/2003 | Levin | |
| 6,683,605 B1 | 1/2004 | Bi et al. | |
| 6,720,801 B2 | 4/2004 | Houlberg | |
| 6,728,298 B1 | 4/2004 | Okubo et al. | |
| 6,754,190 B2 | 6/2004 | Gurney et al. | |
| 6,763,056 B1 | 7/2004 | Ohsuge | |
| 6,768,729 B1 | 7/2004 | Ohsuge | |
| 6,799,094 B1 | 9/2004 | Vaida et al. | 701/3 |
| 6,826,169 B1 | 11/2004 | Nagatani et al. | |
| 6,876,645 B1 | 4/2005 | Guey et al. | |
| 6,894,995 B2 | 5/2005 | Chitrapu et al. | |
| 6,944,149 B1 | 9/2005 | Kim et al. | |
| 6,985,512 B1 | 1/2006 | McDermott et al. | |
| 7,006,032 B2 | 2/2006 | King et al. | |
| 7,053,767 B2 | 5/2006 | Petite et al. | |
| 7,110,435 B1 | 9/2006 | Sorrells et al. | |
| 7,131,136 B2 | 10/2006 | Monroe | |
| 7,203,630 B2 | 4/2007 | Kolb et al. | 703/6 |
| 7,227,884 B2 | 6/2007 | McDermott | |
| 7,236,778 B2 | 6/2007 | Schreiber | |
| D554,474 S | 11/2007 | Miller | |
| D574,221 S | 8/2008 | Allen | |
| 7,430,257 B1 | 9/2008 | Shattil | |
| 7,433,391 B2 | 10/2008 | Stafford et al. | |
| D582,918 S | 12/2008 | Scott | |
| 7,592,953 B2 * | 9/2009 | Morana | 342/357.48 |
| 7,706,748 B2 | 4/2010 | Dutta | |
| 7,848,458 B2 | 12/2010 | Ochiai et al. | |
| 7,876,259 B2 | 1/2011 | Schuchman | |
| 8,054,866 B2 | 11/2011 | Sasaoka et al. | |
| 2002/0024965 A1 | 2/2002 | Lee | |
| 2002/0067759 A1 | 6/2002 | Ertel et al. | |
| 2002/0089434 A1 | 7/2002 | Ghazarian | 340/988 |
| 2002/0097690 A1 | 7/2002 | Fleeter et al. | |
| 2002/0173888 A1 | 11/2002 | Shelton et al. | |
| 2002/0177476 A1 | 11/2002 | Chou | 455/574 |
| 2002/0191632 A1 | 12/2002 | McDermott | |
| 2003/0063576 A1 | 4/2003 | DiFazio | |
| 2003/0123384 A1 | 7/2003 | Agee | |
| 2003/0161428 A1 | 8/2003 | Garrett et al. | |
| 2003/0202485 A1 | 10/2003 | Mansfield | |
| 2003/0204378 A1 | 10/2003 | Cai | |
| 2003/0235148 A1 | 12/2003 | Yang | |
| 2004/0001534 A1 | 1/2004 | Yang | |
| 2004/0008253 A1 | 1/2004 | Monroe | |
| 2004/0029579 A1 | 2/2004 | Kashiwase | |
| 2004/0029615 A1 | 2/2004 | Gerry et al. | |
| 2004/0117611 A1 | 6/2004 | Huber et al. | |
| 2004/0121729 A1 | 6/2004 | Herndon et al. | 455/12.1 |
| 2004/0183673 A1 | 9/2004 | Nageli | 340/539.13 |
| 2004/0246104 A1 | 12/2004 | Baechtiger et al. | 340/10.41 |
| 2005/0038601 A1 | 2/2005 | Dentinger et al. | 701/213 |
| 2005/0041573 A1 | 2/2005 | Eom et al. | |
| 2005/0060339 A1 | 3/2005 | McGee | |
| 2005/0076034 A1 | 4/2005 | Addonisio et al. | 707/10 |
| 2005/0143005 A1 | 6/2005 | Moore, III | |
| 2005/0175123 A1 | 8/2005 | Gurney et al. | |
| 2005/0176436 A1 | 8/2005 | Mantravadi et al. | |
| 2005/0201311 A1 | 9/2005 | Willey et al. | |
| 2005/0201326 A1 | 9/2005 | Lakkis | |
| 2005/0248456 A1 | 11/2005 | Britton et al. | 340/539.29 |
| 2005/0281319 A1 | 12/2005 | Schilling | |
| 2006/0055561 A1 | 3/2006 | Kamali et al. | |
| 2006/0094450 A1 | 5/2006 | Park et al. | |
| 2006/0140314 A1 | 6/2006 | Kim et al. | |
| 2006/0141930 A1 | 6/2006 | Keen et al. | |
| 2006/0187026 A1 | 8/2006 | Kochis | |
| 2006/0233147 A1 | 10/2006 | Karabinis | |
| 2006/0251107 A1 | 11/2006 | Geren et al. | |
| 2007/0031150 A1 | 2/2007 | Fisher et al. | |
| 2007/0040647 A1 | 2/2007 | Saenz et al. | 340/3.1 |
| 2007/0064641 A1 | 3/2007 | Laroia et al. | |
| 2007/0086335 A1 | 4/2007 | McCanne et al. | |
| 2007/0116158 A1 | 5/2007 | Guo et al. | |
| 2007/0117515 A1 | 5/2007 | Sinibaldi et al. | |
| 2007/0130599 A1 | 6/2007 | Monroe | |
| 2007/0202816 A1 | 8/2007 | Zheng | |
| 2007/0223425 A1 | 9/2007 | Masui et al. | |
| 2007/0291826 A1 | 12/2007 | Hafuka | |
| 2007/0293149 A1 | 12/2007 | Wubker | |
| 2007/0298786 A1 | 12/2007 | Meyers et al. | 455/431 |
| 2008/0030345 A1 | 2/2008 | Austin et al. | 340/572.8 |
| 2008/0043653 A1 | 2/2008 | Lakkis | |
| 2008/0181170 A1 | 7/2008 | Branlund et al. | |
| 2009/0042516 A1 | 2/2009 | Karabinis | |
| 2009/0046771 A1 | 2/2009 | Abe et al. | |
| 2009/0135954 A1 | 5/2009 | Salhov et al. | |
| 2009/0175299 A1 | 7/2009 | Hosokawa et al. | |
| 2009/0238246 A1 | 9/2009 | Dawid et al. | |
| 2009/0257517 A1 | 10/2009 | Nordstrom et al. | |
| 2009/0279620 A1 | 11/2009 | Schenk | |
| 2009/0298422 A1 | 12/2009 | Conroy et al. | |
| 2009/0316759 A1 | 12/2009 | Zeira | |
| 2010/0064091 A1 | 3/2010 | Futenma et al. | |
| 2010/0166180 A1 | 7/2010 | Steer et al. | |
| 2010/0322334 A1 | 12/2010 | Wang et al. | |
| 2011/0038261 A1 | 2/2011 | Carlstrom | |

OTHER PUBLICATIONS

Evans, Satellite Communication Systems 3rd edition, Jan. 2009, cover page and p. 468.

Fleeter, Notice of Allowance and Fees Due, U.S. Appl. No. 10/054,175, Aug. 18, 2004, 7 pgs.

Fleeter, Office Action, U.S. Appl. No. 09/130,854, Nov. 22, 2000, 7 pgs.

(56) References Cited

OTHER PUBLICATIONS

Fleeter, Office Action, U.S. Appl. No. 10/992,173, Apr. 8, 2011, 14 pgs.
Fleeter, Final Office Action, U.S. Appl. No. 10/992,173, Oct. 12, 2011, 15 pgs.
Franke, Choosing the best hardware form-factor for the airborne domain of the Joint Tactical Terminal (JTT) and Joint Tactical Radio System (JTRS), Aug. 6, 2002, 8 pgs.
Handermann, Notice of Allowance and Fees Due, U.S. Appl. No. 11/685,936, Dec. 1, 2009, 6 pgs.
Handermann, Office Action, U.S. Appl. No. 11/685,936, Sep. 9, 2009, 22 pgs.
Handermann, Office Action, U.S. Appl. No. 11/685,936, Oct. 20, 2008, 16 pgs.
Handermann, Supplemental Notice of Allowability, U.S. Appl. 11/685,936, Dec. 15, 2009, 4 pgs.
Harms, The Orbcomm Experience, EMPS 2004, Sep. 2004, 6 pgs.
Holm, Why convert to a SAASM-based Global Positioning System?, Military Embedded Systems, Oct. 2005, 3 pgs.
International Search Report and Written Opinion, PCT/US2006/042524, Apr. 22, 2008, 13 pgs.
International Search Report and Written Opinion, PCT/US2006/049656, Feb. 21, 2008, 12 pgs.
International Search Report and Written Opinion, PCT/US2007/063986, Oct. 26, 2007, 12 pgs.
Jordan, Final Office Action, U.S. Appl. No. 11/936,784, Nov. 7, 2011, 16 pgs.
Jordan, Office Action, U.S. Appl. No. 11/936,784, Aug. 27, 2010, 12 pgs.
McDermott, Notice of Allowance and Fees Due, U.S. Appl. No. 11/739,377, Dec. 14, 2011, 7 pgs.
McDermott, Notice of Allowance and Fees Due, U.S. Appl. No. 09/513,962, Sep. 9, 2005, 4 pgs.
McDermott, Notice of Allowance and Fees Due, U.S. Appl. No. 10/208,882, Apr. 10, 2007, 8 pgs.
McDermott, Notice of Allowance and Fees Due, U.S. Appl. No. 11/876,747, Jun. 3, 2009, 7 pgs.
McDermott, Office Action, U.S. Appl. No. 09/513,962, Sep. 14, 2004, 6 pgs.
McDermott, Final Office Action, U.S. Appl. No. 09/513,962, Apr. 16, 2004, 10 pgs.
McDermott, Office Action, U.S. Appl. No. 09/513,962, Jun. 24, 2003, 10 pgs.
McDermott, Final Office Action, U.S. Appl. No. 09/513,962, May 27, 2005, 9 pgs.
McDermott, Office Action, U.S. Appl. No. 11/739,377, Aug. 23, 2011, 17 pgs.
McDermott, Office Action, U.S. Appl. No. 11/876,747, Nov. 28, 2008, 5 pgs.
McDermott, Office Action, U.S. Appl. No. 10/208,882, Jan. 3, 2007, 11 pgs.
Meyers, Notice of Allowance and Fees Due, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance and Fees Due, U.S. Appl. No. 11/618,379, May 13, 2009, 4 pgs.
Morana, Office Action, U.S. Appl. No. 11/618,379, Jan. 6, 2009, 7 pgs.
Morana, Office Action, U.S. Appl. No. 29/270,057, Feb. 26, 2009, 5 pgs.
Ormesher, Current Radar Responsive Tag Development Activities at Sandia National Laboratories, Proc. of SPIE vol. 5410, 2004, 7 pgs.
Skiscim, Notice of Allowance and Fees Due, U.S. Appl. No. 12/101,391, Jul. 22, 2011, 18 pgs.
Skiscim, Office Action, U.S. Appl. No. 12/101,391, Jan. 4, 2011, 14 pgs.
Smith, Office Action, U.S. Appl. No. 12/396,447, Dec. 5, 2011, 31 pgs.
Stafford, Notice of Allowance and Fees Due, U.S. Appl. No. 11/681,759, Aug. 13, 2008, 7 pgs.
Stafford, Notice of Allowance and Fees Due, U.S. Appl. No. 11/937,826, Jul. 29, 2011, 8 pgs.
Stafford, Final Office Action, U.S. Appl. No. 11/681,759, May 20, 2008, 8 pgs.
Stafford, Office Action, U.S. Appl. No. 11/681,759, Dec. 21, 2007, 7 pgs.
Stafford, Office Action, U.S. Appl. No. 11/937,826, Sep. 16, 2010, 5 pgs.
Summers, Plug and play testbed to enable responsive space missions, IEEE paper #1221, Mar. 5-12, 2005, 8 pgs.
Zenick Jr., Notice of Allowance and Issue Fee Due, U.S. Appl. No. 09/045,970, Sep. 24, 2001, 2 pgs.
Zenick Jr., Office Action, U.S. Appl. No. 09/045,970, Apr. 10, 2001, 4 pgs.
Zenick Jr., Office Action, U.S. Appl. No. 09/045,970, Oct. 25, 2001, 3 pgs.
Candell, Office Action, U.S. Appl. No. 12/692,789, Mar. 30, 2012, 8 pgs.
Berthet, Synchronization Complexity for a Satellite Multimedia Burst Receiver, NORSIG99, Sep. 9-11, 1999, Asker, Norway, 5 pgs.
Larson, Space Mission Analysis and Design, Second Edition, Chapter 22, Design of Low-Cost Spacecraft, 1992, 2 cover sheets and pp. 767-796.
Candell, Office Action, U.S. Appl. No. 12/692,789, Sep. 21, 2012, 10 pgs.
Fleeter, Office Action, U.S. Appl. No. 10/992,173, Oct. 17, 2012, 17 pgs.
Fleeter, Office Action, U.S. Appl. No. 13/422,173, Jun. 8, 2012, 16 pgs.
Fleeter, Office Action, U.S. Appl. No. 13/422,195, Jul. 16, 2012, 23 pgs.
Smith, Notice of Allowance, U.S. Appl. No. 12/396,447, Jun. 5, 2012, 7 pgs.
DVB User Guidelines for the Second Generation System for Broadcasting, Interactive Services, News Gathering and Other Broadband Satellite Applications (DVB-S2), ETSI TR 102 376 v.1.1.1 Technical Report, 2005, 104 pgs.
HT PHY Specification, Enhanced Wireless Consortium publication V1.27, Dec. 23, 2005, 67 pgs.
McDermott, Office Action, U.S. Appl. No. 12/890,578, Oct. 26, 2012, 14 pgs.
Candell, Notice of Allowance, U.S. Appl. No. 12/692,789, May 10, 2013, 6 pgs.
Fleeter, Notice of Allowance, U.S. Appl. No. 13/422,195, Apr. 23, 2013, 9 pgs.
Fleeter, Office Action, U.S. Appl. No. 13/422,173, May 20, 2013, 21 pgs.
Fleeter, Office Action, U.S. Appl. No. 13/422,195, Dec. 6, 2012, 17 pgs.
McDermott, Final Office Action, U.S. Appl. No. 12/890,578, May 16, 2013, 19 pgs.
Singleton, Office Action, U.S. Appl. No. 12/693,116, Oct. 26, 2012, 9 pgs.

* cited by examiner

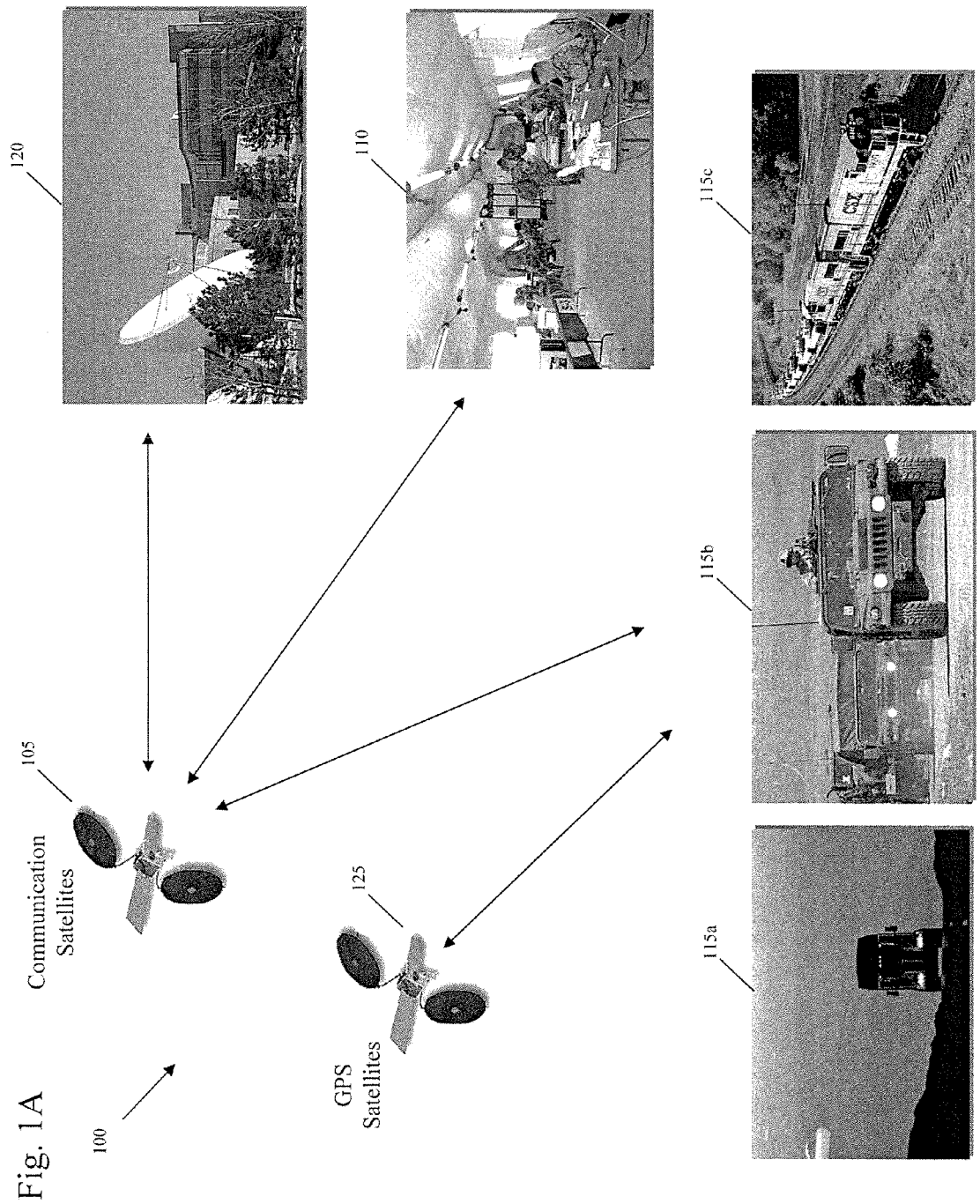

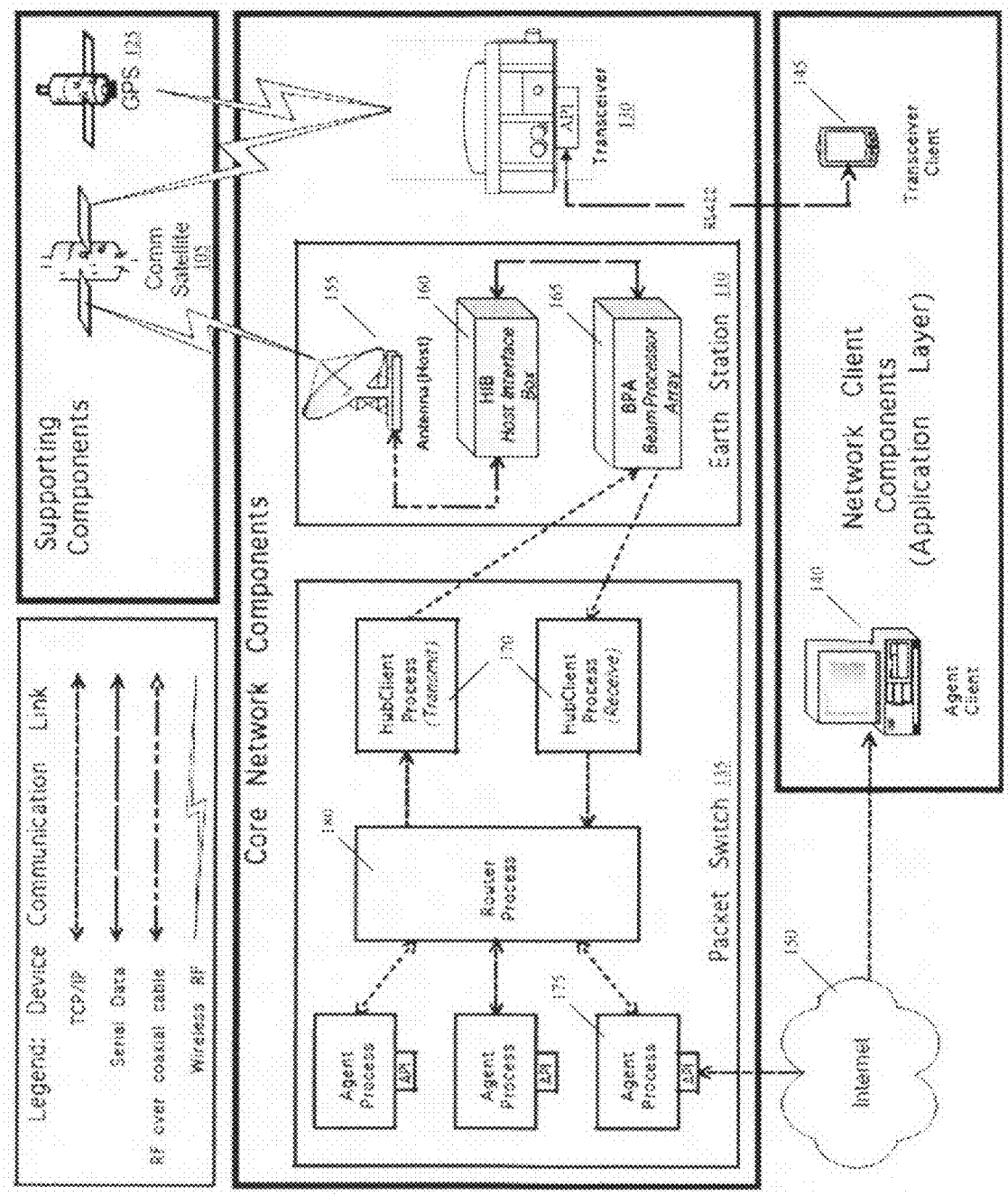

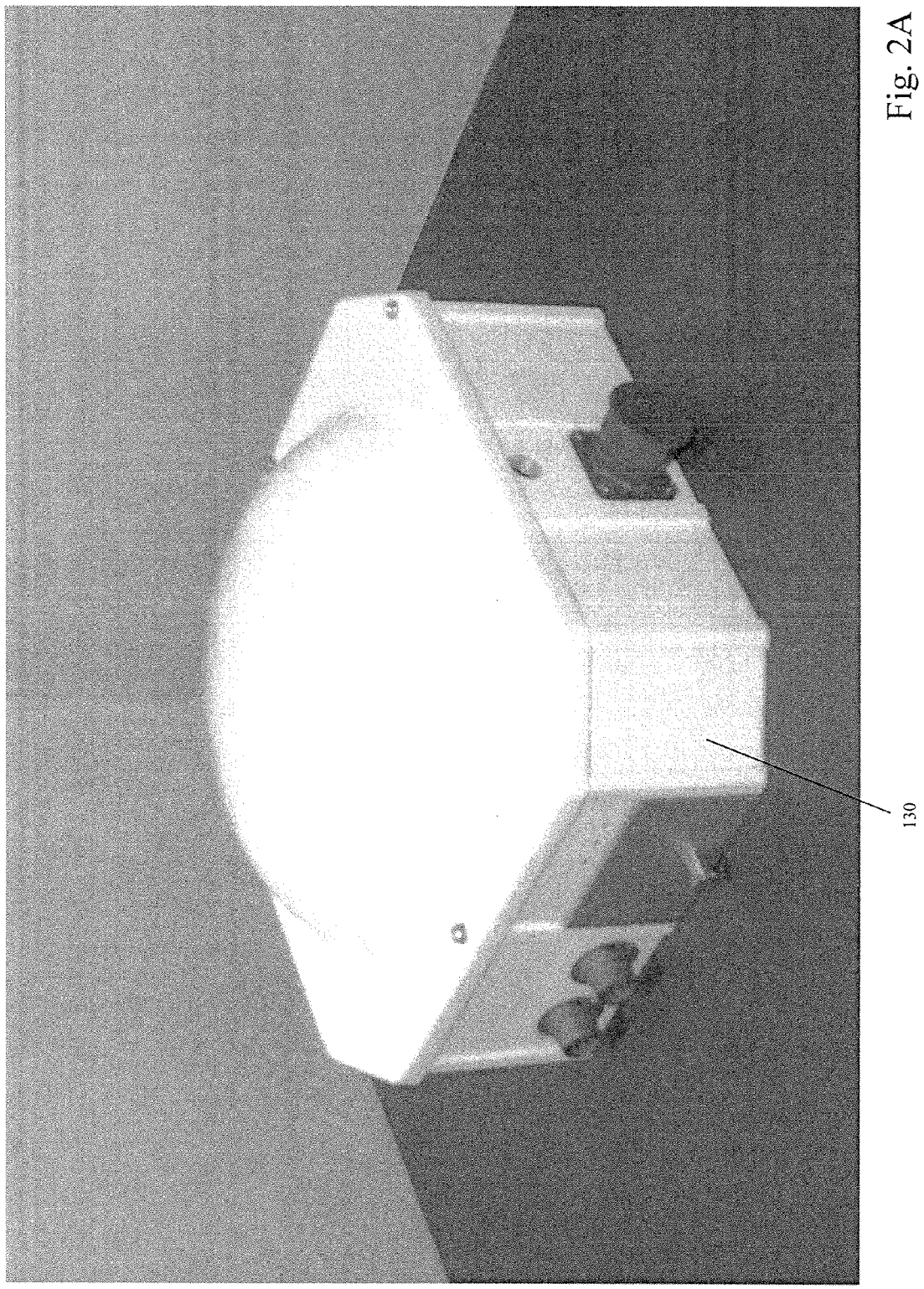

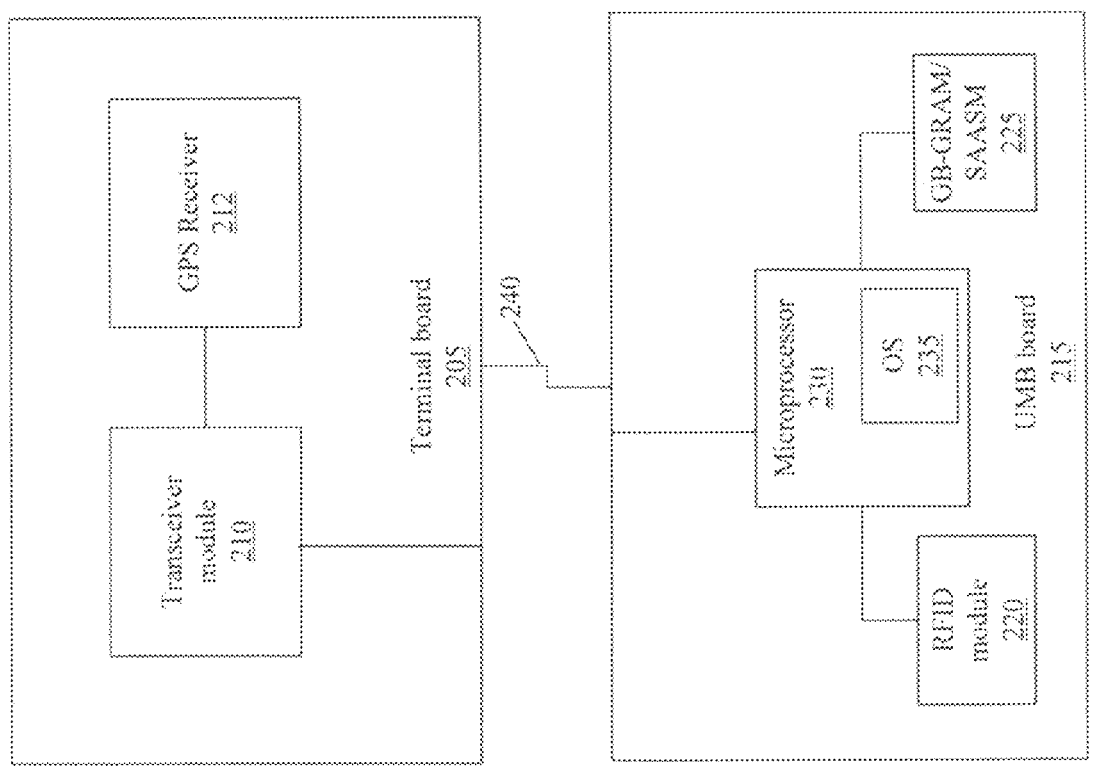

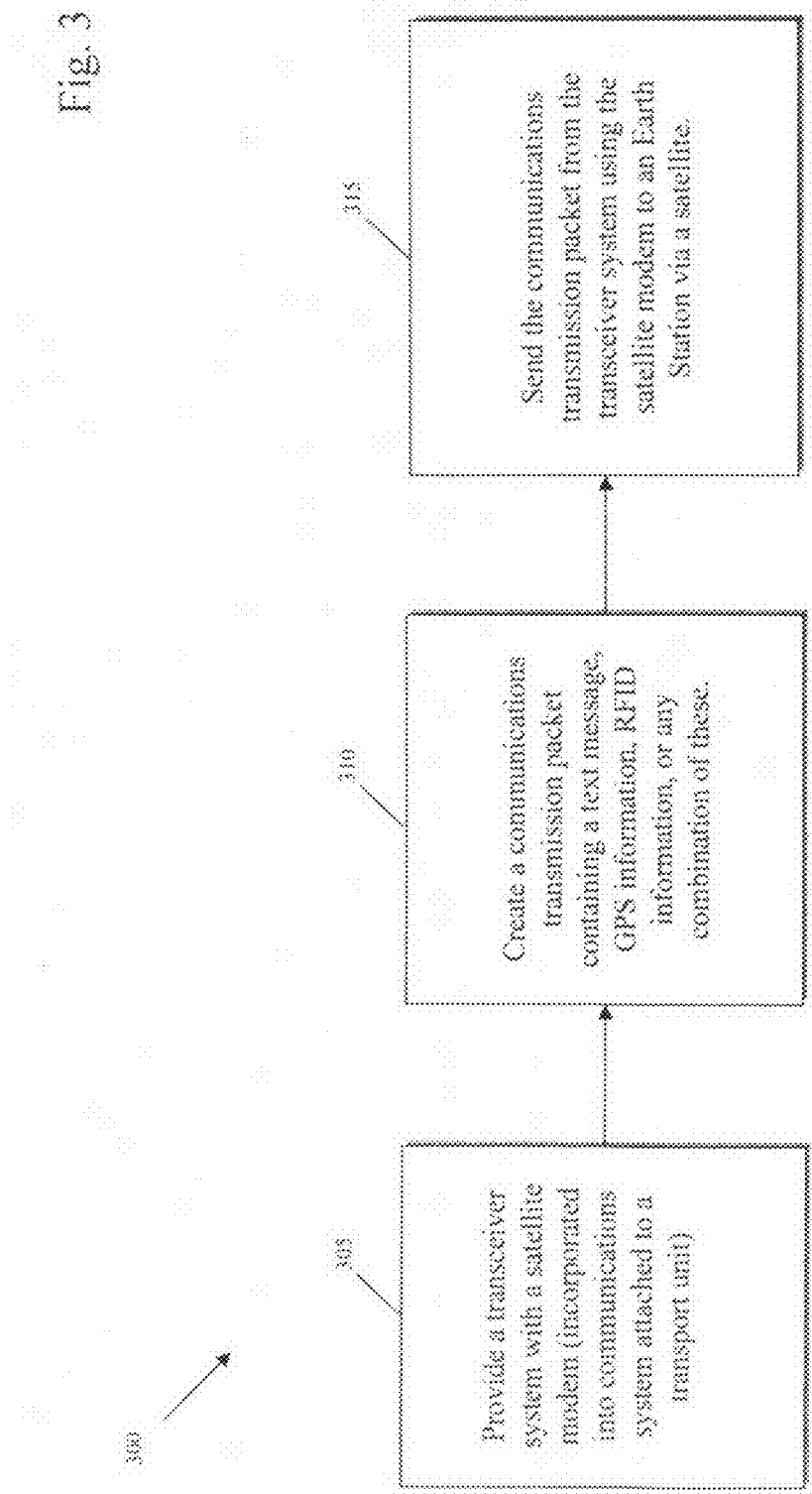

MOBILE SATELLITE COMMUNICATIONS

The present invention is a continuation application of application Ser. No. 11/618,379, filed on Dec. 29, 2006 now U.S. Pat. No. 7,592,953, which claims the benefit of U.S. Provisional Patent Application No. 60/755,405 filed on Dec. 30, 2005, which is hereby incorporated by reference.

CROSS-REFERENCE TO RELATED APPLICATIONS

This application claims priority to and the benefit of, and incorporates herein by reference in their entirety, provisional U.S. patent application Ser. No. 60/755,405 filed Dec. 30, 2005.

GOVERNMENT RIGHTS

The government may have certain rights in the invention under Contract No. DAAB15-99-D-0014.

FIELD OF THE INVENTION

The present invention relates generally to satellite transceiver systems and specifically to mobile satellite transceiver systems.

BACKGROUND

Devices that receive signals from Global Positioning System (GPS) satellites are generally available to members of the public. Though useful for telling the individual holding the unit where on Earth the individual is, these GPS receivers do not typically transmit the location of the individual. Thus the coordinates are useful to the individual, but not to someone that wants to find the individual.

Systems used by the armed forces for transporting goods, supplies, and materials (logistic systems) may have access to radio transmitters to report the location of vehicles and/or units to headquarters. When manually coupled with a GPS receiver, an individual in a unit can inform headquarters of his or her position via verbally relaying the coordinates via radio.

Likewise, corporations may have similar systems in place to track cargo transports, e.g., reporting location information to a corporate operations center, or they may utilize point-of-reception reporting, i.e., updating the location of a good or supply when the item is processed by an intermediate facility.

An obstacle to efficient utilization of these technologies is the size of the components of the communication system and the awkwardness of manual combination of the components by an operator. These technologies lack a unified arrangement that maximizes the efficiency of the technology while simultaneously minimizing the footprint of the system.

SUMMARY OF THE TECHNOLOGY

Though GPS receivers and transmitters are useful for determining and reporting the location of a vehicle, they are not generally useful for further communications, e.g., vehicle status, operator status, or if any of the cargo has been delivered, lost, or damaged.

In one implementation there is a method for communicating between a transport unit and an Earth station via a communications satellite. The method includes providing the mobile satellite transceiver system (the transceiver attached to the transport unit), creating a communications transmission packet, and sending the communications transmission packet from the satellite modem of transceiver system to the Earth station. In some versions of the method, the communications transmission packet includes the location of the transceiver or transceiver system based on received GPS coordinates. In some versions, the communications transmission packet additionally or alternatively includes a text message. Where an RFID interrogator is present, e.g., coupled to the transceiver system or the transceiver, the communications transmission packet includes RFID data, e.g., the presence of a particular RFID tag. Some implementations of the method further include receiving any of the above communications packets via the satellite modem of the transceiver or transceiver system.

In some implementations there is a mobile satellite transceiver system for communicating with a Global Positioning System (GPS) satellite and a communications satellite. The mobile satellite transceiver system includes a GPS receiver configured to receive communications from the GPS satellite, a satellite modem configured to transmit and receive communications to and from the communications satellite, and an operating system for processing communications transmitted to and received from the communications satellite. In some implementations, the operating system of the mobile satellite transceiver system is configured to send and receive text messages to/from the communications satellite via the satellite modem. In some implementations the mobile satellite transceiver system also includes a Radio Frequency Identification (RFID) interrogator for communicating with RFID tags. In some versions, the GPS receiver of the mobile satellite system is a Ground-Based GPS Receiver Application Module (GB-GRAM) with a Selective Availability Anti-Spoofing Module (SAASM). Typically the mobile satellite transceiver system is attached to a vehicle, e.g., a truck or transport vehicle, often via screws or a magnetic mounting bracket.

There is also a method for communicating between a transport unit and an Earth station via a communications satellite. The method involves providing a mobile satellite transceiver system that includes a Global Positioning System (GPS) receiver configured to receive communications from a GPS satellite, a satellite modem configured to transmit and receive communications to and from the communications satellite, and an operating system for processing communications transmitted to and received from the communications satellite. In these embodiments, the mobile satellite transceiver system is attached to the transport unit. The method further involves creating a communications transmission packet, by the operating system of the mobile satellite transceiver. Then the packet is sent, using the satellite modem of the mobile satellite transceiver system to the Earth station via the communications satellite. In some implementations, the mobile satellite transceiver system also includes a Radio Frequency Identification (RFID) interrogator.

There is also a mobile satellite transceiver system for communicating with a Global Positioning System (GPS) satellite and a communications satellite that includes a first and second logic board. The first logic board typically includes a commercial-grade GPS receiver module configured to receive communications from the GPS satellite and a satellite modem module configured to transmit and receive communications from the communications satellite. The second logic board typically includes a Ground-Based GPS Receiver Application Module (GB-GRAM) with Selective Availability Anti-Spoofing Module (SAASM), an RFID interrogator module, and an operating system. The GB-GRAM module provides military-grade GPS accuracy beyond that achievable with the commercial-grade GPS on the first logic board.

Typically the first logic board and the second logic board are in signal communication and the operating system coordinates a signal communication between a first module of the first logic board and a second module of the second logic board. In some implementations the RFID interrogator is not present and only the GB-GRAM/SAASM module is present. In other implementations there no GB-GRAM/SAASM module present and there is only a RFID interrogator. In some implementations neither the GB-GRAM/SAASM module nor the RFID interrogator is present and only GPS receiver is the commercial-grade receiver on the first board. Multiple possible configurations are beneficial in that a customer purchasing the mobile satellite transceiver system can customize the mobile satellite transceiver system to fit their needs.

There is also a mobile satellite transceiver means for communicating with a Global Positioning System (GPS) satellite and a communications satellite. The mobile satellite transceiver means includes a GPS receiver means for receiving communications from the GPS satellite, a satellite modem means for transmitting and receiving communications to and from the communications satellite, and an operating system means for processing communications transmitted to and received from the communications satellite.

Any of the implementations of the mobile satellite transceiver system are operable using L-Band communications channels such as MSAT, INMARSAT, Thuraya, Artemis, ACeS, OPTUS, or combinations of these, thereby providing communications beyond-line-of-sight. Communications typically include the location of the mobile satellite transceiver system based on received Global Positioning System (GPS) coordinates, text messages, RFID data (when an RFID interrogator is provided), or any combination of these. Typically transmissions and received signals are encrypted using Triple Data Encryption Standard (DES) algorithms, Advanced Encryption Standard (AES) algorithms, Rivest Shamir Adleman (RSA) algorithms, or a combination of these. Additionally, many implementations also provide a 512 kilobyte memory buffer for transmissions to be sent and/or received. Typically, antennas for the mobile satellite transceiver system reside within the housing of the system, e.g., no external antenna is necessary.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 1A depicts a messaging system for communicating between headquarters, transports, and network management centers, via satellite;

FIG. 1B depicts an alternate implementation of the messaging system of FIG. 1A that includes a mobile satellite transceiver system;

FIG. 2A depicts a mobile satellite transceiver system used in some implementations of the systems of FIGS. 1A and 1B;

FIG. 2B is a block diagram depicting two logic boards used in some implementations of the mobile satellite transceiver system of FIG. 2A; and FIG. 3 depicts a method for communicating between a transport unit and an Earth station via a communications satellite.

DETAILED DESCRIPTION

The mobile satellite transceiver system described herein is typically incorporated into a messaging system. The mobile satellite transceiver system is usually attached to a vehicle includes a housing typically containing components such as a GPS receiver, a satellite modem transceiver, and an RFID interrogator. The mobile satellite transceiver system incorporates a satellite modems to communicate with communications satellites in Earth's orbit.

Implementations of the messaging system that incorporate the mobile satellite transceiver system provide near real-time communication services via satellite between a vehicle utilizing the mobile satellite transceiver system and a ground unit. Typically the ground unit is an "Earth station" or "headquarters," though any ground, sea, and/or air-based unit may be communicated with. Advantageously, the near real-time communications include, but are not limited to, position reporting, vehicle status, operator status, cargo status, and/or text-messaging. Further, some implementations provide built-in encryption mechanisms to secure communications sent between the vehicle and headquarters. By incorporating encryption into the device, as opposed to using an external encryption mechanism, the overall space used on a vehicle (i.e., the "footprint") is reduced.

Implementations of the mobile satellite transceiver system generally are contained within a rugged metal housing that is designed to withstand the rigors of battlefield use. Typical implementations provide commercial-grade GPS capabilities separate from the transceiver. Some implementations of the mobile satellite transceiver system further integrate Ground-Based GPS Receiver Application Module ("GB-GRAM") military GPS technology (and corresponding antennas) and/ or a Selective Availability Anti-Spoofing Module (SAASM) (described below). Implementations typically additionally provide RFID interrogator capabilities via a RFID transceiver/interrogator component. Combinations of these configurations are also provided, e.g., commercial-grade GPS alone, commercial-grade GPS with RFID capabilities, GB-GRAM and/or SAASM alone, and GB-GRAM/SAASM with RFID capabilities.

In implementations that incorporate RFID capabilities, an RFID interrogator component is used to transmit a signal requesting a response from RFID receivers ("tags") nearby. RFID tags located nearby (e.g., under ten meters), receive the signal and respond with a self-identifying signal. The RFID tags used in conjunction with the RFID interrogator may be passive, semi-passive, or active. Passive RFID tags have no internal power supply and instead receive any necessary power from the RFID interrogator signal. Semi-passive RFIDs tags contain a battery and remain constantly powered. Semi-passive RFIDs typically respond to an interrogation signal faster than a passive RFID tag. Active RFID tags transmit a self-identifying signal periodically and do not wait for the RFID interrogator signal.

The RFID interrogator receives responses signals from the RFID tags and reports the results via the device to headquarters. The status reports allow headquarters to determine that the location and cargo sent from the warehouse or loading point matches the expected cargo at that particular point. For example: A transport truck left headquarters with boxes X, Y, and Z, each having an RFID tag. En route, the RFID transceiver transmits an interrogator signal. The RFID tags on each box responds. A first status report and a location indicator are sent, via the transceiver, to headquarters. Based on the received status report, headquarters knows that boxes X, Y, and Z are en route to the destination. After the first status report is sent to headquarters, box Y is dropped off at military base alpha. En route to military base beta, the RFID transceiver transmits a second interrogation signal. Boxes X and Z respond. Box Y does not reply because box Y was dropped off is out of range of the interrogation signal. Based on the second status report that is sent to headquarters, headquarters determines that box Y is no longer on the transport truck (likely box Y was scanned as dropped off at military base alpha and this was communicated to headquarters through other means). Some implementations also provide a 512 kilobyte buffer to accept large data dumps for packetized transmission over the satellite communications link.

FIG. 1A depicts a messaging system 100 that incorporates the mobile satellite transceiver system described herein (not shown) for communicating (via communications satellites 105) between Earth stations 110, transports 115 fitted with the mobile satellite transceiver system, and network management centers 120. Earth stations 110, such as military bases, bases of operations, outposts, corporate operations centers, or the like send communications to the communications satellites 105, which then send communications to the transports 115. The Earth stations 110 send communication signals (intended for transports 115 or network management centers 120) to communication satellite units 105 using standard communications channels, e.g., an L-Band communications channel. In some implementations communications to and from the satellite 105 are encrypted using commercial, government (e.g., the National Security Agency—"NSA") approved encryption schemes such as Triple Data Encryption Standard (DES) algorithms, Advanced Encryption Standard (AES) algorithms, Rivest Shamir Adleman (RSA) algorithms, or any combination thereof. The satellite 105 then sends the communication signals down to the intended targets, e.g., commercial transport trucks 115a, personnel carriers 115b, trains 115c and/or air and/or sea vehicles (not shown) (generally "mobiles" 115), and/or network management centers 120. In the case of mobiles 115, communication signals sent from the mobiles 115 back to the communications satellites 105 include, but are not limited to, GPS position reports, text messages, and/or RFID tag information. GPS information of the mobiles 115 is received by the mobiles from GPS satellites 125 via the mobile satellite transceiver system. In some implementations communications between the communications satellites 105 and the Earth stations 110 are sent directly to the Earth stations 110. In other implementations these communications are sent to network management centers 120 first, which in turn send the communications to Earth stations 110 using commercial satellites or using conventional networking technologies, e.g., Ethernet and T1 "land lines."

An alternative implementation or view of the messaging system 100 is provided in FIG. 1B. The primary components in FIG. 1B are the mobile satellite transceiver system 130, GPS satellites 125, a communications satellite 105, an Earth Station 110, a packet switch network 135, and an agent application 140. The mobile satellite transceiver system 130 is a portable communications device with a built in satellite modem, GPS receiver, and autonomous operating system. The mobile satellite transceiver system 130 provides mobile and/or fixed-remote access to the messaging system 100 network. The Global Positioning System includes a satellite "constellation" 125 that provides location signals to the GPS receivers of the mobile satellite transceiver system 130. The messaging system 100 also includes a communications satellite 105 that provides a Radio Frequency (RF) communications relay between remote the mobile satellite transceiver system 130 and Earth stations 110. The Earth station 110 includes antennas and collocated hardware that handle the RF communication between the packet switch 135 and a particular communications satellite 105. The packet switch 135 is a computer cluster that provides the central message routing and delivery functionality, allowing network clients to communicate. The Network Operations Center (NOC) is typically located in the premises of the operator of the messaging system 100 and its backup sites. In some implementations, the NOC is located at a secure location on the premises of a customer of the messaging system 100. Agent client applications 140 are peripheral customer application that connects to the messaging system 100 network (via the packet switch 135) to locate or communicate with other network clients (typically the mobile satellite transceiver system 130 and/or client applications 145 in signal communication with the mobile satellite transceiver system 130). The transceiver client applications 145 are peripheral devices (and related software) that connect to the messaging system 100 (via the mobile satellite transceiver system 130) to locate or communicate with other network clients (agent clients 140 and/or other Transceiver Clients 145).

The messaging system 100 uses satellite technology for both mobile/remote communication and for location tracking. This makes the messaging system 100 an advantageous service platform for two major types of applications: Supervisory Control and Data Acquisition (SCADA) and mobile messaging and location tracking.

SCADA systems are generally used to monitor and/or control remote facilities. For example, a metropolitan water and sewer utility may use a SCADA application to centrally monitor conditions (e.g., water levels in remote storage tanks, flow rates at key points in a pipeline, etc.) or to control equipment (e.g., remotely operate a series of valves). The messaging system 100 and the mobile satellite transceiver system 130 are particularly well suited to provide the communication linkage for remote SCADA locations that are not served by traditional telecommunications facilities. Central locations (such as headquarters or data centers) can access the messaging system 100 over the Internet 150 to communicate with remote locations.

The messaging system 100 is also useful for mobile messaging and location tracking. Many mobile applications require both a data exchange capability and a location tracking capability. The messaging system 100 allows a customer, such as a trucking company, to establish a private communication network that links each vehicle (or shipping container) with a central dispatch center to establish and provide a cryptographically isolated communication network. The message capability can be used for dispatch, delivery tracking, emergency alerts, etc. The GPS capability allows up-to-the-minute location tracking for each vehicle.

Some implementations of the mobile satellite transceiver system 130 include a commercial-grade GPS receiver. Typically in the mobile satellite transceiver system 130 these GPS capabilities are provided by a GPS receiver component within the system 130. A GPS receiver (in the mobile satellite transceiver system 130) within view of at least three GPS satellites can determine its ground position to within 30 meters. With four satellites, the GPS receiver can also determine altitude, speed, and direction of travel (i.e., course over ground).

Implementations of the mobile satellite transceiver system 130 provide a variety of configuration options with respect to automatic GPS reporting. One option causes the mobile satellite transceiver system 130 to autonomously transmit GPS information to the packet switch 135 at a regular interval. This allows the mobile satellite transceiver system 130 to act as a tracking device for the messaging system 100, regardless of whether a transceiver client 145 is involved. Additional options allow a transceiver client 145 to retrieve current GPS data. Some options allow the client application to show the current location on a map provided by mapping software installed on the transceiver client 145. In some implementations, some network applications utilize military-grade GPS, allowing for greater location-determining precision. In these implementations, the mobile satellite transceiver system 130 is used in conjunction with, and interfaces with a transceiver client 145 that includes a military-grade GPS receiver.

The scalable design of the messaging system 100 architecture allows a single network to support multiple user groups. In some versions, the messaging system 100 network configuration segregates each of the user groups that coexist on a network, thereby creating a Virtual Private Network (VPN) for each group. Examples of user groups include a collection of Agent client applications 140 and associated mobile satellite transceiver systems 130 that operate within the confines of a VPN. Typically, a user group represents a particular business customer. However, a user group also represents, in some instances, a separate functional division within a customer's organization. The messaging system 100 uses a combination of encryption, address ("node") scheme configuration, and packet switch 135 process organization to form and secure each VPN.

The messaging system 100 also advantageously provides a flexible addressing scheme for VPNs. The messaging system 100 uses an address abstraction scheme to control message delivery within a VPN. This scheme is based on a collection of named delivery targets known as nodes. Nodes are pre-defined as part of the messaging system 100 configuration and provisioning. At run-time, the messaging system 100 associates a node to one or more actual network elements (agent clients 140 or mobile satellite transceiver systems 130) based on a combination of configuration and real-time events. Each messaging system message is addressed to a specific node (determined by its sender). The messaging system 100 delivers the message to all network elements currently associated with the specified node. This scheme provides a great deal of address flexibility. Node configuration schemes may be creatively constructed to provide individual element addresses as well as broadcast or multicast groups.

The messaging system 100 advantageously generally delivers messages in "Datagram mode." In this mode, the sender receives no confirmation that a message has been received. This reduces the data sent back and forth between sender and recipient, thereby reducing traffic on the messaging system 100. For messages transmitted from an agent client 140 to the mobile satellite transceiver system 130 the messaging system 100 also supports "reliable mode." In reliable mode, the packet switch 135 transmits a message repeatedly until the message is received and acknowledged by the mobile satellite transceiver system 130 (or until the retry limit is exhausted). The sending agent client 140 receives explicit notification of message success or failure. While this increases traffic on the messaging system 100, this ensures that the message sent was received, thereby increasing the trustworthiness that a message got through.

The messaging system 100 uses three key technologies to secure network data communication: Digital Spread Spectrum and CDMA technology, customer-level data encryption, and a network firewall. Combined, these mechanisms essentially create a VPN that protects the communication between a customer's agents 140 and transceivers 130.

The messaging system 100 uses Digital Spread Spectrum Code Division Multiple Access (DSS-CDMA) for all radio communications between a mobile satellite transceiver system 130, communications satellites 105, and earth stations 110. These methodologies are designed to insure secure and reliable radio communications. In one implementation, the digital message content is combined with deliberate "noise" data and transmitted in a "burst" of bits that are spread over a range of frequencies. This implementation is typically more secure than other implementations. In another implementation, the digital message content is combined with deliberate noise data and transmitted using a fixed data sequence. This implementation is typically more cost-effective to implement, is more reliable, and is more fool-proof. In both implementations, and others, the data is encrypted using a pseudo-random algorithm and a key. Each transmission typically lasts less than 400 milliseconds, and appears as random static to most radio receivers. The receiving device is equipped with a matching algorithm and key, allowing it to detect the transmission and reassemble the original content. Additionally or alternatively, encryption schemes such as Triple Data Encryption Standard (DES) algorithms, Advanced Encryption Standard (AES) algorithms, Rivest Shamir Adleman (RSA) algorithms, or combinations of these are used to further secure communications.

The DSS-CDMA methodology makes the transmission extremely difficult to detect (known as Low Probability of Detection or "LPD"). Even if a transmission is detected and captured, it is even more difficult to decode the message content (known as Low Probability of Interception or "LPI"). DSS communication is also much less subject to RF noise or signal jamming. This provides a very high level of security and reliability for the satellite communications segment of the messaging system 100 network.

The messaging system 100 also applies internal encryption to message content to create customer-level data encryption. Separate key sets are used for each user group (or VPN). This further reinforces the internal separation of customers' proprietary information within the messaging system 100 network. The mobile satellite transceiver system 130 encrypts message content before transmitting and decrypts the contents after receiving. The packet switch 135 performs a similar function at the point that it communicates with an agent client application 140. This approach further insures privacy between various customers being served by a particular packet switch 135. The customer-level data encryption also hides customer message content from network operations staff.

Additionally, the messaging system 100 uses a network firewall to increase protection. The packet switch 135 uses a standard network firewall to protect against unauthorized external access. The firewall is configured to allow access only to pre-defined agent client applications 140.

An Earth station 110 handles the RF communication between the packet switch 135 and a particular communication satellite 105. The Earth station 110 includes a satellite dish 155 and collocated electronic components (a host-interface box or "HIB" 160 and a beam processor array or "BPA" 165). Combined, these components perform translation between the RF communications used by the communications satellite 105 and the traditional network communications used by the packet switch 135. In essence, an Earth station 110 serves as the packet switch's 135 satellite modem. In some implementations, an Earth station 110 serves as a transmitter, a receiver, and/or both. Often Earth stations 110 are dedicated to a particular role. Transmitting stations generally require an operating license and are subject to restrictions with regard to local geography and population density. As a result, transmitting dishes are typically located in remote, sparsely populated areas. Transmitting dishes are usually owned and operated by the satellite service vendor. Vendors also normally provide collocation space for the BPA 165 and HIB 155 components.

Receiver stations do not require licensing and are subject to little or no legal restrictions. They can be placed almost any-where that has an unobstructed view of the target communications satellite 105. As a result, receiving Earth stations 110 may be fully owned and operated by an operator of the messaging system 100 or an autonomous customer.

As described herein, several components make up an Earth station 110: the antenna 155, the HIB 160, and the BPA 165. The antenna 155 (commonly referred to as "the host") is the satellite dish that handles direct radio communication with a specific communications satellite 105. Depending on its role, e.g., transmitter, a receiver, or both, the host 155 usually includes additional electronics such as signal amplifiers (for transmitters), RF noise filters (for receivers), and frequency converters (for transmitters and receivers). A transmitting host 155 takes the RF signal from the HIB 160 and transmits it toward the communications satellite 105. A receiving host 155 captures the satellite's 105 radio transmission and delivers it to the HIB 160.

The HIB 160 links the BPA 165 components to the host 155. The HIB 160 consists of an array of electronic and RF components, in some implementations assembled into a single chassis. The primary electronic function of the HIB 160 is to perform the conversion between the digitized DSS-CDMA serial data stream used by the Beam Processor Array 165 and the analog RF signal format used by both the host 155 and the communications satellite 105.

From an architectural perspective, the HIB 160 also serves as a 'host adapter' (as its name implies). It insulates the standardized interface of the BPA 165 from the potential variation of the host 155 interfaces. Implementations of the HIB 160 are compatible with most standard host 155 interfaces. When the messaging system 100 is adapted to a new type of host interface, however, advantageously the HIB's electronic composition can be adjusted to meet the requirements. The physical composition of the HIB 160 varies depending on the number of communication satellites 105 and/or 'beams'(coverage areas) being served by the Earth station 110. It also varies based on the station's role as a transmitter or receiver.

The Beam Processor Array 165 is a collection of processing modules (known as beam processors) that provide the satellite modem functionality within the Earth station 110. The 'array' is basically a chassis containing one or more independent beam processors. The beam processors in the array 165 serve as the link between the packet switch 135 and the HIB 160 on behalf of a specific satellite beam. The beam processors perform the conversion between the TCP/IP packet data format used by the packet switch 135 and digitized DSS-CDMA serial data stream used by the HIB 160. In essence, it is the satellite modem for a particular beam. A beam processor may be configured as a transmitter, as a receiver, or as both (dual-mode). The transmitter functionality and the receiver functionality operate as separate, independent processing channels (even if a beam processor is used in dual mode). The composition of the Beam Processor Array 165 varies depending on the number of beams being serviced by the Earth station 110, the role of the Earth station 110 as a transmitter and/or receiver, and the hardware redundancy plan for the array 165.

The packet switch 135 forms the central core of the messaging system 100 network. Physically, the packet switch 135 consists of one or more networked computers that run a Unix operating system (in a preferred implementation the computers run FreeBSD). Logically, the packet switch 135 comprises a set of distributed processes and configuration stores.

The packet switch 135 communicates with Earth stations 110 to perform message exchange with transceivers 130 (and associated transceiver clients 145). The packet switch 135 also provides the agent API and serves as the host for all agent client application 140 sessions. The packet switch 135, in some versions, serves as a master network router, accepting messages from senders and delivering them to the intended recipient(s). The primary functionality of the packet switch resides in three types of component processes: hub-client 170, agent 175, and router 180. These processes communicate with each other and with other, network components using TCP/IP connections. This architecture allows the processes to be distributed across the machines that form the packet switch 135, thereby providing maximum scalability.

The HubClient Process ("HubClient") 170 is the packet switch's Earth station 110 interface process. It handles the communications between the packet switch 135 and a particular beam processor within the BPA 165 of an Earth station 110. In some versions, the packet switch 135 operates a separate instance of the HubClient process 170 for each beam processor channel (transmitting or receiving). This means that a particular HubClient 170 instance assumes a role as either a receiver or a transmitter. Each transmitter HubClient 170 accepts outbound messages from the router process 180 and relays them to its associated beam processor for translation and satellite transmission. Each receiver HubClient accepts inbound messages from its associated beam processor and relays them to the router process 180.

The agent process 175 is the packet switch's customer-facing subcomponent. The agent processes host the agent's API, serving as the gateway between a customer's business applications (agent clients 140) and the messaging system 100 network. Among other abilities, this allows an agent client 140 to track and exchange messages with its related transceivers 130.

From an architectural perspective, an agent process 175 also serves as the anchor point for its designated user group or VPN. Consequently, the packet switch 135 runs a separate instance of the agent process 175 for each distinct user group. The configuration of a particular agent process 175 defines the scope and membership of its related VPN.

An agent process 175 can host API connections (or agent client 140 sessions) for multiple agent clients 140. This gives the customer the option of dedicating agent clients 140 to specific functions within the VPN (such as dispatch, GPS tracking, general message exchange, etc.). An agent process 175 is also responsible for central message processing within the VPN. This includes encryption/decryption for the agent client 140 sessions. The agent process 175 communicates with the router process 180 to receive inbound messages from the mobile satellite transceiver system 130 and to send outbound messages to the mobile satellite transceiver system 130. The agent process 175 also serves as an intermediary for transceiver-to-transceiver messages within a VPN.

The router process handles message routing between agent processes 175 and the HubClient processes 170. Conventionally, the router process 180 is a single process on the packet switch 135. However, for scalability, the messaging system 100 architecture allows multiple router processes 180 to work in concert to form a distributed virtual router. The router processes relay outbound messages received from agent processes to the appropriate HubClient(s) 170 for transmission over the appropriate beams. The router process 180 relays inbound messages from a HubClient 170 to the agent process 175 that is responsible for the sending transceiver's VPN.

Within the core network components, the messaging system 100 architecture provides two interfaces for network client applications: the agent process API and the transceiver API. Both APIs consist of a command line interpreter (CLI) and a specific command set that operates in a fashion similar to a traditional DOS command prompt. The client can execute appropriate commands to accomplish tasks (such as sending a message to another network client).

Each agent process 175 on the packet switch 135 provides an agent process API, which is designed to support a customer's central or ground-based applications (agent clients 140). Agent clients 140 operate from outside the messaging system 100 network—typically on a customer's private system platform. The agent processes usually connect to the agent API using TCP/IP over the Internet (or other dedicated circuit). The agent client 140 can then use the API to receive GPS tracking data from transceivers and/or exchange messages with other network clients within the VPN.

One implementation of the mobile satellite transceiver system 130 provides an external RS-422 serial interface designed to connect to an external device (e.g., a transceiver client 145). In some implementations, a transceiver client 145 is a PC, hand-held terminal, and/or a customized device.

Once connected to the mobile satellite transceiver system 130, the transceiver client 145 has access to the transceiver API command set. A transceiver client 145 can then use the mobile satellite transceiver system 130 to exchange messages with agent clients 140 (or other transceivers 130) within the VPN. The transceiver client 145 also retrieves the current GPS location the mobile satellite transceiver system 130. The transceiver API also allows a transceiver client 145 to control a number of functions and settings of the mobile satellite transceiver system 130, including, but not limited to, digital I/O, power management, and emergency mode operation.

The overall messaging system 100 architecture includes network client components (applications and devices) that use the network. In some implementations, however, network clients are considered peripheral to the core network architecture because client application development and operations is conceptually the domain of the customer or an external technology partner. Client applications generally fall into either of two categories: agent clients 140 or transceiver clients 145.

Agent clients 140 are users or applications that connect to the messaging system 100 network using the agent API. This normally involves a TCP/IP connection over the Internet, dedicated circuit, and/or dial-up connection. Once connected, the agent client 140 has full access to the agent API command set. In most agent client 140 scenarios, the interaction with the API is performed by software—either by an automated process, or by a translation layer that acts on behalf of a human user. However, it is possible for a user to engage the API directly using a utility such as TELNET. The primary purpose of most agent clients 140 is to exchange messages with transceivers 130 and/or track their locations.

It is customary for an agent client 140 to assume the identity of a pre-defined network node while connected to the network, thus allowing it to receive the messages addressed to the node. This technique, combined with proper configuration of the mobile satellite transceiver system 130 and an appropriate node addressing scheme, allows an agent client 140 to act as a central point of communication or data collection for certain network applications. Since an agent process 175 can handle multiple simultaneous agent clients 140, it is possible to design agent clients 140 with specific, dedicated roles within the network application scheme.

Since agent clients 140 typically connect to the messaging system 100 over the Internet, the connection is likely to support a much higher communication bandwidth than the transceiver/satellite linkage. Agent clients 140 have a better potential for maintaining a continuous, long-term connection with the network. These factors tend to concentrate higher-traffic application roles (such as central dispatch or GPS location tracking) to the realm of agent clients 140 rather than transceiver clients 145.

Transceiver clients 145 are users or applications that connect to the messaging system 100 network through the mobile satellite transceiver system 130 using the transceiver API. In some implementations this is achieved via an RS-422 serial connection between the mobile satellite transceiver system 130 and the device acting as the transceiver client 145. Once connected, the transceiver client 145 has full access to the transceiver API command set.

In most transceiver client 145 scenarios, the interaction with the API is performed by software—either by an automated process, or by a translation layer that acts on behalf of a human user. However, it is possible for a user to engage the API directly using commonly available terminal emulation utilities such as PC-Plus, HyperTerminal, etc. The primary purpose of most transceiver clients 145 is to exchange messages with other network clients (either the mobile satellite transceiver system 130 or agent clients 140) and/or determine its own current location (or that of other mobile satellite transceiver systems 130). The nature of the RS-422 serial interface limits the mobile satellite transceiver system 130 to only one transceiver client 145 at a time. The nature of the satellite communication linkage (with respect to both speed and transience), limits a transceiver client's practical ability to handle central application roles that require significant data volume or bandwidth. This inherent limitation is somewhat lessened for fixed-remote transceiver applications (since they are usually able to maintain a constant lock on the satellite).

FIG. 2A depicts a mobile satellite transceiver system 130 used in some implementations of the systems of FIGS. 1A and 1B. Some implementations of the mobile satellite transceiver system 130 incorporate RFID interrogator. Additionally or alternatively, some versions include Ground-Based GPS Receiver Application Module (GB-GRAM) with a Selective Availability Anti-Spoofing Module (SAASM). SAASM-capable receivers can directly acquire military P(Y) code signals from a GPS satellite 120. The P(Y) code has more robust anti jamming defenses than a civilian code (which any individual can access with a commercial receiver). Being SAASM-capable does not provide jamming immunity; rather it enables access to the more secure military P(Y) code. SAASM-enabled receivers can also acquire encrypted Y-code directly from satellite, without relying on local radio signals. SAASM allows for satellite authentication, over-the-air rekeying, and contingency recovery, features typically available with the similar, but older PPS-SM system. SAASM-enable receivers also allow for updating with an encrypted "Black Key" that may be transmitted over unclassified channels.

In some implementations, the mobile satellite transceiver system 130 also has text messaging capabilities. The messaging system 100 is designed to transport short message packets between network clients. A network client may be either an agent client 140 connected to the packet switch 135, or a mobile satellite transceiver system 130 (used in a mobile or fixed-remote application). The messaging system 100 messages are somewhat analogous (though distinctly different as explained below) to email messages in the following respects: The user (or client application) provides message content (known as payload). Messages are routed and delivered to the destination asynchronously—usually within a few seconds. There is no guarantee that the intended recipient is presently available to read the message. It is possible to request confirmation of delivery from the receiving party. The message (as a whole) includes standard header information used for network routing. Message content is typically represented in printable ASCII text. Binary content must be encoded as printable ASCII text in the form of Hexadecimal pairs. However, messaging system 100 messages differ from email in the following ways: message payload (the carrying capacity available for text or application data) is limited to 100-110 bytes. Messages are addressed to other messaging system 100 network members using a proprietary addressing scheme (rather than a traditional email address). Messages must be addressed to a single destination node. There is typically no explicit 'CC' capability, though multicasting and broadcasting capabilities are available in some implementations. The messaging system 100 message transport mechanism is ideal for applications that must exchange short, independent data packets on a relatively infrequent basis.

The mobile satellite transceiver system 130 is intended to withstand most outdoor environments. They are typically installed in housing mounted to a vehicle or container (for mobile applications), or mounted to a stationary object such as a sensor station on a remote pipeline (for fixed-remote applications).

Many implementations of the mobile satellite transceiver system 130 provide the following capabilities and advantages: an L-Band satellite modem that operate over MSAT, INMARSAT, Thuraya, Artemis, ACeS, and OPTUS L-Band channels, a commercial-grade GPS receiver, on-board processor and operating system, RS-422 Serial interface to connect to for external devices, API command set to serve a user or client application from an attached peripheral device, emergency alert mode, ability to automatically detect and tune to appropriate satellite communication frequency (known as World Wide Autonomy or WWA), 'over-the-air' configuration capability (known as remote provisioning), auxiliary power supply for external devices, and power management features.

The mobile satellite transceiver system 130 is additionally or alternatively equipped with an internal operating system that operates autonomously. This allows the mobile satellite transceiver system 130 to maintain a communications lock on the satellite, and to accept messages from the messaging system 100 network. It can also be configured to periodically report its GPS location and general status to the packet switch 135. The operating system also contains the command-line interface and command set that serves as the API for an attached transceiver client 145.

In some versions, the operating system is configured to meet the interface requirements of the Gen III RF interrogator board produced by Savi Technology (of Sunnyvale, Calif.) and/or a GRAM SAASM board (including health and diagnostic capabilities for both). Interrogator capabilities include determining an RFID tag's identity information, e.g., tag number, received signal strength indicator, battery status code and/or the tag's header data, e.g., tag number, Transportation Control Number ("TCN"), Consignee DODAAC and/or Commodity Class). Interrogator requests may occur at defined intervals or on-demand from an Earth station 110. Interrogation may be turned on and off on an as-needed basis. Messages sent may also include a bumper number (e.g., a unit ID or a combat ID), a grid location, date and time, manual inputs for RFID tags (if necessary, e.g., tag reading malfunction). Some implementations of the transceiver 130 are configured to cause RFID tags to emit audible beeps.

The mobile satellite transceiver system 130 may also support "virtual LEDs" or status indicators that are changed and/or set by software to indicate an established satellite link, indication of data transmission and/or reception, or other statuses. The mobile satellite transceiver system 130 may also utilize an external cryptographic device to the cryptographic keys used during communications. The external cryptographic device is typically connected via a RS 422 serial connector.

One implementation of the mobile satellite transceiver system 130 has the following specifications. The mobile satellite transceiver's size is approximately eight inches wide by eight inches deep by five inches tall (i.e., 8"×8"×5"). It weighs approximately 11 lbs and has an operating temperature of −40° C. to +65° C. This implementation of the mobile satellite transceiver 130 is 100% humidity and highly water resistant and operates at altitudes of 0 to 25,000 feet. The main interface to the unit is a RS-422 serial port (military-style connector) and the unit requires 10-32 volts of direct current ("vdc") at 1 ampere power. Power is supplied through a 12 vdc input and the Mobile Satellite Transceiver uses 0.25 amps during receiving operations, 2.0 amps (for <400 msec/msg) while transmitting, and less than 0.001 amps while "sleeping." The transmit frequencies used are 1610.0 to 1660.5 MHz and receive frequencies are between 1525.0 and 1559 MHz and are transmitted at under five watts. The mobile satellite transceiver system 130 includes a transceiver that operates as a satellite modem, where modulation used by the mobile satellite transceiver system 130 is direct sequence spread spectrum and antennas for five different bands are incorporated into the housing. Further, the implementation is compatible with the application programming interface ("API") of the MT-2011 transceiver produced by Comtech Mobile Datacom Corporation (of Germantown, Md.).

FIG. 2B depicts one implementation of the components inside the housing depicted in FIG. 2A. In some implementations, the mobile satellite transceiver system incorporates two logic boards with differing functions. The first logic board 205 (in some implementations referred to as the "terminal board") includes the transceiver module 210 that includes a satellite modem for communicating with the communication satellites. Some implementations of the transceiver include a Digital Signal Processor (DSP), a commercial-grade GPS receiver 212, a power supply, input/output modules, an antenna (which may be right-hand circular polarized, left-hand circular polarized, or both), a synthesizer, a transmission filter/modulator, a receiver low-noise amplifier, a demodulator, a baseband filter, or any combination of these. The second logic board 215, in some implementations referred to as the "user mother board" (UMB), includes an RFID interrogator module 220, a GB-GRAM module with SAASM 225, a power supply, a sequencer, an low-noise amplifier for the GB-GRAM module, a user input/output interface, or a combination of these. Additionally, the UMB typically, incorporates a microprocessor 230 to execute operating system code 235 and route communications between the transceiver, the GPS receiver module, the GB-GRAM/SAASM module, and/or the RFID interrogator module. The logic boards are in signal communication 240 with each other via, wires, pin connectors, or the like. FIG. 2B represents a conceptual layout of the logic boards and not necessarily an actual physical implementation, e.g., typically the logic boards are physically "stacked" horizontally.

FIG. 3 depicts a method 300 for communicating between a transport unit and an Earth station via a communications satellite. The method begins by providing the mobile satellite transceiver system 130 described above. The mobile satellite transceiver system is typically attached to the transport unit, though in some implementations, the mobile satellite transceiver system is attached to a fixed location. The method then involves creating a communications transmission packet (see e.g. step 310). In some instances, the communications transmission packet includes the GPS coordinates of the transceiver (and thereby the transport unit). In some instances, the communications transmission packet is a text message that reports the status of cargo, the status of the transport unit, RFID information, or the like. The method concludes by sending the communications transmission packet from the transceiver to the Earth station (via the communications satellite) (see e.g. step 315).

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, optical disks, and/or flash memory. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube), LED (Light Emitting Diodes), or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a ground server, data server, and/or a middleware component, e.g., an application server, and/or a front-end component, e.g., a client computer having a graphical user interface, or any combination of such back-end, middleware, or front-end components. The components of the system can be interconnected by any form or medium of digital data communication, e.g., a communication network. Examples of communication networks include a satellite network, a local area network ("LAN"), and/or a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers or devices and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A mobile satellite transceiver system for communicating with a Global Positioning System (GPS) satellite and a communications satellite comprising:
    a GPS receiver configured to receive communications from the GPS satellite;
    a satellite modem configured to transmit and receive communications to and from the communications satellite;
    an operating system for processing communications transmitted to and received from the communications satellite, wherein the operating system is configured to send and receive a text message to the communications satellite via the satellite modem; and
    a Radio Frequency Identification (RFID) interrogator.

2. The mobile satellite transceiver system of claim 1 further comprising a 512 kilobyte memory buffer.

3. The mobile satellite transceiver system of claim 1 wherein the GPS receiver is a Ground-Based GPS Receiver Application Module (GB-GRAM) with a Selective Availability Anti-Spoofing Module (SAASM).

4. The mobile satellite transceiver system of claim 1 wherein communications from the communications satellite are transmitted and received using an L-Band communications channel.

5. The mobile satellite transceiver system of claim 4 wherein the L-Band communications channel comprises at least one of MSAT, INMARSAT, Thuraya, Artemis, ACeS, OPTUS, or any combination thereof.

6. The mobile satellite transceiver system of claim 1 wherein communications transmitted and received via the satellite modem are encrypted using at least one of Triple Data Encryption Standard (DES) algorithms, Advanced Encryption Standard (AES) algorithms, Rivest Shamir Adleman (RSA) algorithms, or any combination thereof.

7. A method for communicating between a transport unit and an Earth station via a communications satellite comprising:
    providing a mobile satellite transceiver system comprising:

a Global Positioning System (GPS) receiver configured to receive communications from a GPS satellite;

a satellite modem configured to transmit and receive communications from the communications satellite;

an operating system for processing communications transmitted to and received from the communications satellite, wherein the operating system is configured to send and receive a text message to the communications satellite via the satellite modem;

a Radio Frequency Identification (RFID) interrogator, wherein the mobile satellite transceiver system is attached to the transport unit;

creating, by the operating system, a communications transmission packet including a text message; and sending, by the satellite modem, the communications transmission packet to the Earth station via the communications satellite.

8. The method of claim 7 wherein the communications transmission packet also comprises a location of the mobile satellite transceiver system based on received Global Positioning System (GPS) coordinates.

9. The method of claim 7 wherein the communications transmission packet also comprises a Radio Frequency Identification (RFID) data.

10. The method of claim 7 wherein the communications transmission packet provides communications beyond-line-of-sight.

11. A mobile satellite transceiver means for communicating with a Global Positioning System (GPS) satellite and a communications satellite comprising:

a GPS receiver means for receiving communications from the GPS satellite;

a satellite modem means for transmitting and receiving communications to and from the communications satellite;

an operating system means for processing communications transmitted to and received from the communications satellite, wherein the operating system means is configured to send and receive a text message to the communications satellite via the satellite modem; and a Radio Frequency Identification (RFID) interrogator means.

12. The mobile satellite transceiver means of claim 11 further comprising a mounting means to attach the mobile satellite transceiver means to a vehicle.

13. The mobile satellite transceiver means of claim 12, wherein the mounting means comprises a magnetic mounting bracket.

14. The mobile satellite transceiver means of claim 11, wherein the GPS receiver means comprises:

a commercial-grade GPS receiver means configured to receive communications from the GPS satellite with commercial-grade accuracy;

a military-grade GPS receiver means configured to receive communications from the GPS satellite with military-grade GPS accuracy; and wherein the operating system means further coordinates communications between the commercial-grade GPS receiver means and the military-grade GPS receiver means.

15. The mobile satellite transceiver means of claim 14, wherein the military-grade GPS receiver means comprises a Ground-Based GPS Receiver Application Module (GB-GRAM) with a Selective Availability Anti-Spoofing Module (SAASM).

16. The satellite transceiver system of claim 1 further comprising a mounting element to attach the mobile satellite transceiver system to a vehicle.

17. The satellite transceiver system of claim 16, wherein the mounting element comprises a magnetic mounting bracket.

18. The mobile satellite transceiver system of claim 1, wherein the GPS receiver comprises:

a commercial-grade GPS receiver module configured to receive communications from the GPS satellite with commercial-grade accuracy;

a military-grade GPS receiver module configured to receive communications from the GPS satellite with military-grade GPS accuracy; and wherein the operating system means further coordinates communications between the commercial-grade GPS receiver module and the military-grade GPS receiver module.

19. The mobile satellite transceiver system of claim 18, wherein the military-grade GPS receiver module comprises a Ground-Based GPS Receiver Application Module (GB-GRAM) with a Selective Availability Anti-Spoofing Module (SAASM).

20. The mobile satellite transceiver system of claim 17, wherein the commercial-grade GPS receiver module is included on a first logic board, and the military-grade GPS receiver module is included on a second logic board.

* * * * *